INVENTORS
KENNETH V. HARDMAN &
ALFRED J. ANDERSON
BY Eyre, Mann & Lucas
ATTORNEYS June 8, 1965  K. V. HARDMAN ETAL  3,187,951
CAULKING GUN
Filed Oct. 4, 1963
4 Sheets-Sheet 3
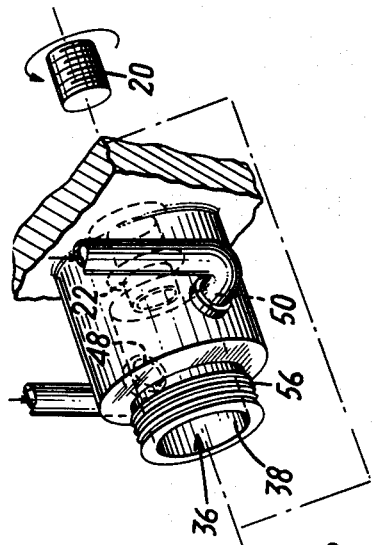
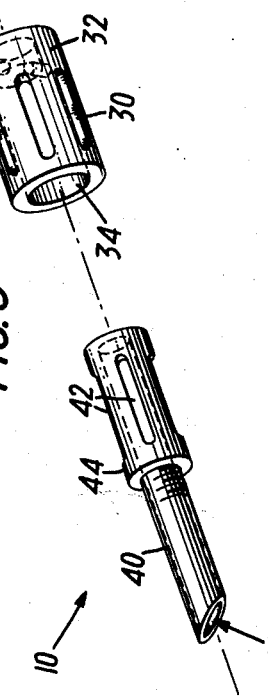
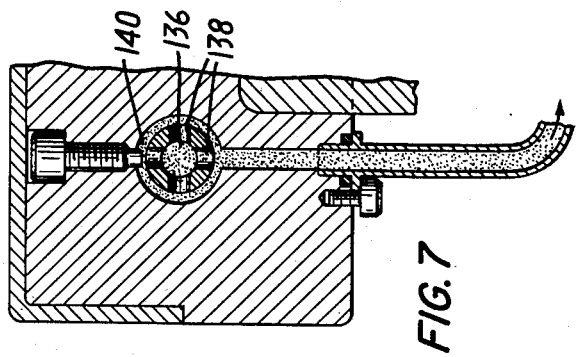
FIG. 7
FIG. 6
FIG. 5
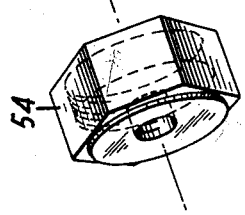
INVENTORS
KENNETH V. HARDMAN &
ALFRED J. ANDERSON
BY *Eyre, Mann & Lucas*
ATTORNEYS

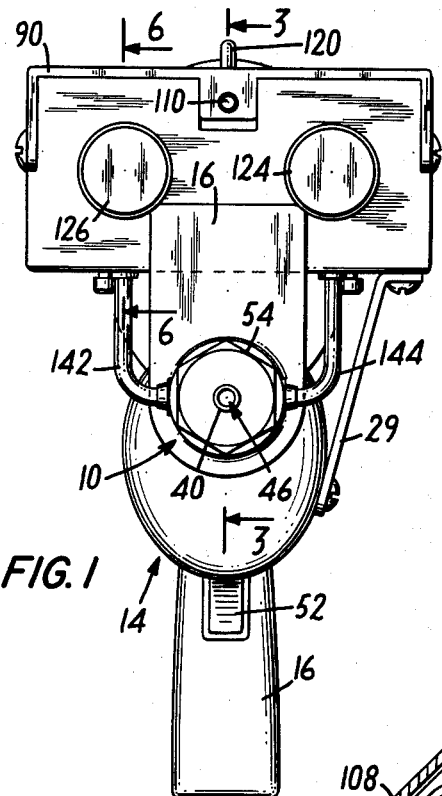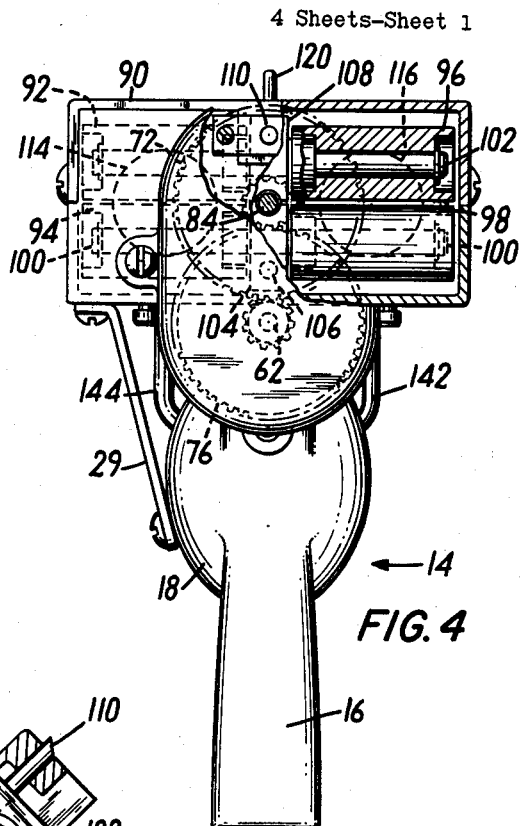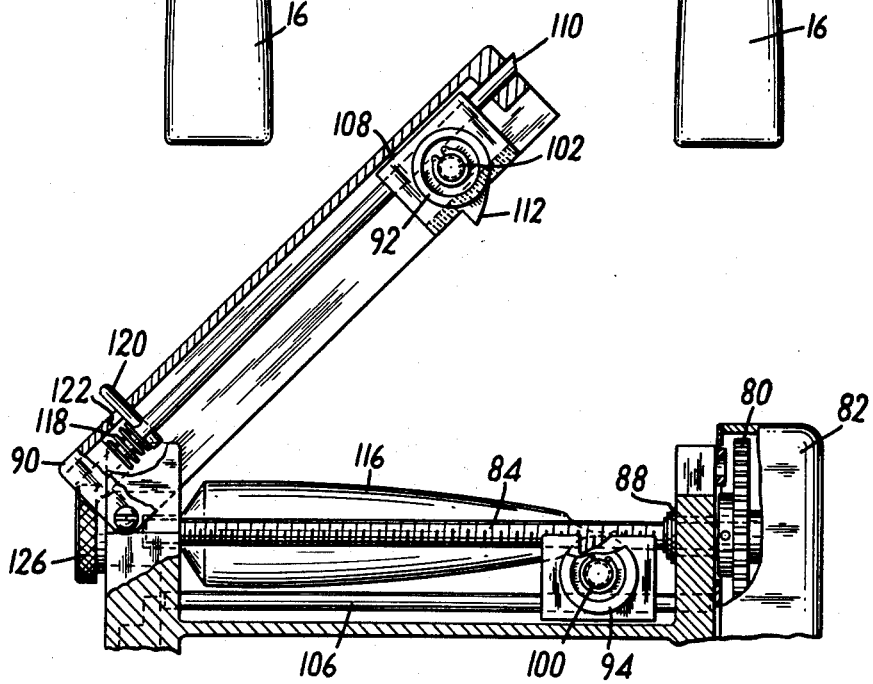

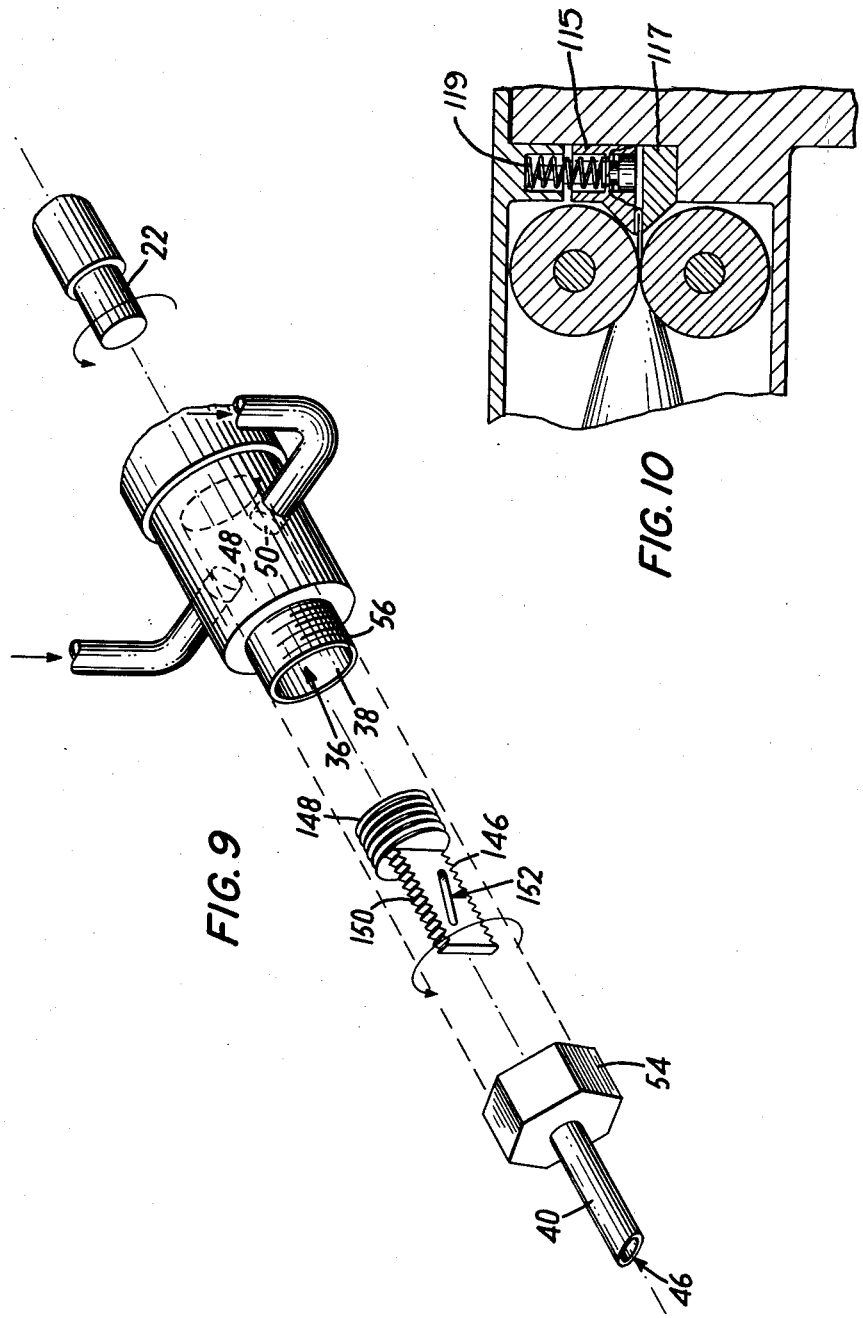

United States Patent Office 3,187,951
Patented June 8, 1965

3,187,951
CAULKING GUN
Kenneth V. Hardman, Upper Montclair, and Alfred J. Anderson, Livingston, N.J., assignors to H. V. Hardman Co., Inc., a corporation of New Jersey
Filed Oct. 4, 1963, Ser. No. 313,960
4 Claims. (Cl. 222—102)

The present invention relates to the mixing of reactive flowable materials such as liquids and pastes together in predetermined proportions and desired amounts to form a mixture and to the dispensing of that mixture at desired locations.

In accordance with the present invention the mixing and dispensing are both performed by a hand held caulking gun which eliminates the necessity of mixing, measuring and handling of reactive flowable materials by the caulking gun operator. The flowable materials are loaded into the gun by the operator in separate collapsible tubes especially designed for use with the gun. Once the gun is loaded, the operator points the nozzle of the gun at the crack or seam to be sealed and presses the trigger of the gun. The gun then strips the reactive flowable materials from collapsible tubes in the predetermined proportions and forces them into the mixing chamber of the gun where they are mixed together and immediately dispensed as a mixture out the nozzle of the gun into the crack or seam to be sealed. When the crack or seam is filled the operator releases the trigger and both mixing and dispensing come to a halt completing the caulking operation without the operator ever having to touch the reactive flowable materials.

A better understanding of the present invention and its advantages can best be had by a more detailed description of the caulking gun in connection with the accompanying figures of the caulking gun of which:

FIGURE 1 is a front elevation of the caulking gun;

FIGURE 4 is a back elevation of the caulking gun with the protective back plate and the casing partially broken away;

FIGURE 5 is an exploded view of the mixing chamber of the caulking gun;

FIGURE 6 is a partial sectional view of the caulking gun taken along lines 6—6 in FIGURES 1 and 2;

FIGURE 7 is a partial sectional view taken along line 7—7 in FIGURE 2 to show one of the channels in the caulking gun for feeding the flowable material from the collapsible tubes to the mixing chambers;

FIGURE 8 is a partial view taken substantially along line 3—3 of the caulking gun with the cover raised to allow loading or unloading of the tubes;

FIGURE 9 is an exploded view of a mixing chamber with an alternate form of agitator; and FIGURE 10 is a section through one of the spring loaded jaws for holding the crimped ends of the collapsible tubes in position.

Figures 2, 3:
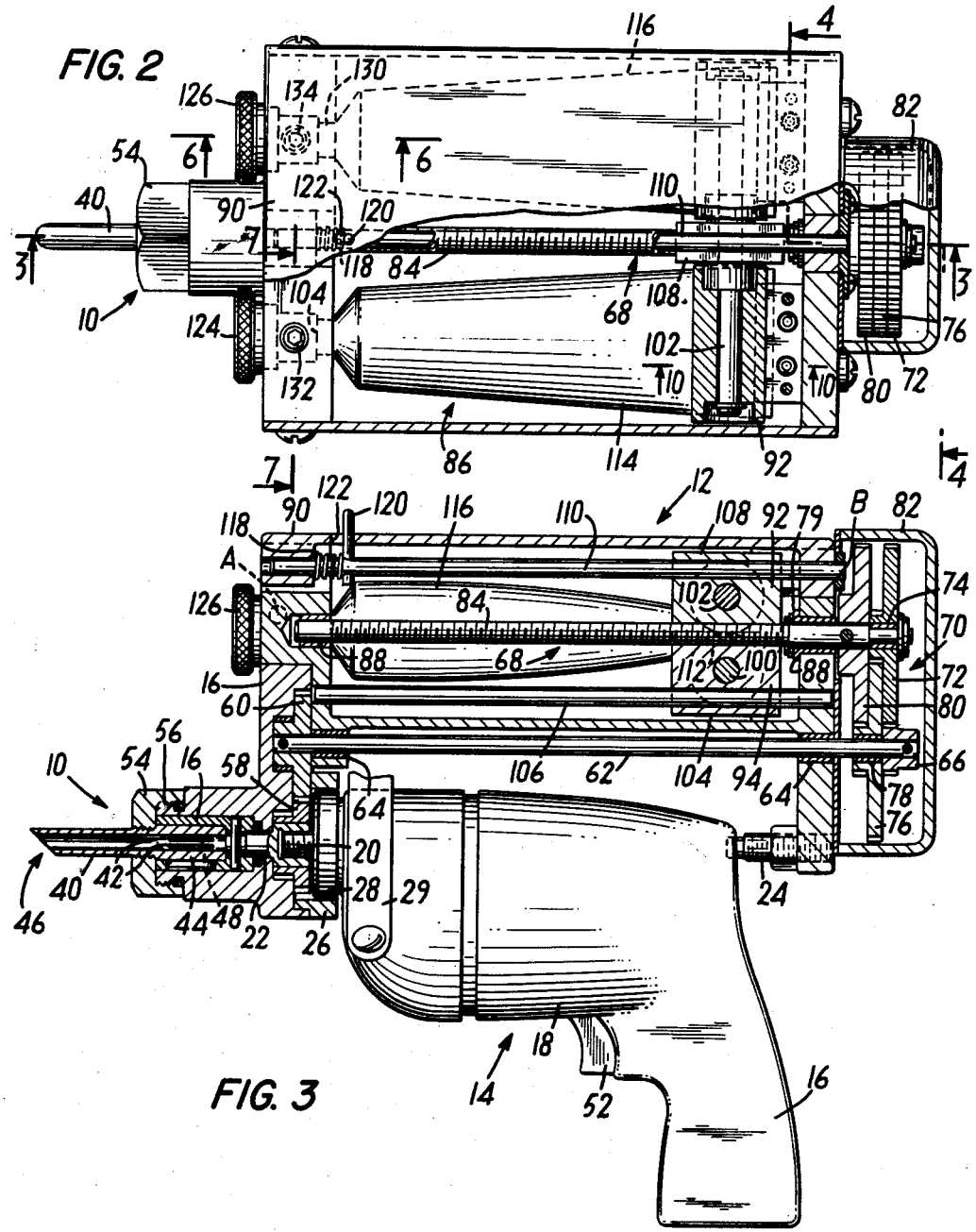
FIGURE 2 is a top view of the caulking gun with the cover removed to reveal the collapsible tubes.
FIGURE 3 is a partial sectional view of the caulking gun taking along lines 3—3 in FIGURES 1 and 2.

Basically, the caulking gun comprises mixing means 10, a mechanism 12 for stripping the flowable materials from the tubes and forcing it into the mixing means, and means 14 for powering the agitator 16 and the stripping mechanism 12.

The mixing means and the stripping means are in a housing 16 which is mounted on a standard ⅜ of an inch drill 18 that has been modified by the removal of the usual Jacobs chuck. The drive shaft 20 of the drill is threaded directly to an opening in an extension shaft 22 which is connected directly to the agitator 16 for the mixing chamber. An adjustable stud 24 which extends forwardly from the rear of the housing to contact the back of the drill, a collar 26 on the housing which surrounds the neck 28 of the drill, and a brace 29 which is connected between the body of the drill and the housing are provided to hold the drill in the proper operating position with respect to the housing and prevent relative movement between the housing and the drill.

Referring to FIGURE 5, the agitator 16 is a hollow cylinder with a number of longitudinal slots 30 therein which extend through the agitator between the exterior 32 and interior 34 surfaces of the agitator. The agitator fits coaxially into a cylindrical mixing chamber 36 with the exterior surface 32 of the agitator in a closely spaced orientation with the interior surface 38 of the mixing chamber. Positioned coaxially within the hollow of agitator 16 is a portion of stationary discharge nozzle 40. Like the agitator 16 the discharge nozzle 40 has a number of longitudinal slots 42 therein which extend from the exterior cylindrical surface 44 of the discharge nozzle into the discharge port 46, and like the interior wall of the mixing chamber 36 and the exterior wall of the agitator 16, the interior wall 34 of the agitator 10 and the exterior wall 44 of the stationary nozzle 40 are closely positioned with respect to one another.

When the trigger 52 of the drill is pressed the agitator rotates at high speed with respect to the interior wall 38 of the mixing chamber and the exterior wall 62 of the nozzle 44. The interior wall 38 of the mixing chamber has two openings 48 and 50 therein through which the flowable materials are separately forced into the mixing chamber as herein after disclosed. When these materials are forced through the openings 48 and 50 they are dragged along by the rotating agitator 16 and mixed together, by shearing action, between the closely spaced interior wall 38 of the mixing chamber 36 and the exterior wall 32 of the agitator. Forced by more material entering the mixing chamber, the materials then pass through the longitudinal slots 30 of the agitator into the space between the interior wall 34 of the agitator and the exterior wall 44 of the nozzle where they are again subjected to shearing action this time between the closely spaced interior wall 34 of the agitator and the exterior wall 44 of the nozzle. Thereafter they are forced by more material entering the mixing chamber 36 through the longitudinal slots 42 in the nozzle into the nozzle passageway 46 thoroughly mixed together.

The agitator and the nozzle are preferably made of an inexpensive plastic and can be removed from the mixing chamber for cleaning or disposal by the removal of a clamp ring 54 which is threaded to the nozzle 40 and to a neck 56 on the body of the mixing chamber 10.

Mounted coaxially around the drive shaft extension 22 is a gear 58 which engages a second larger gear 60 mounted on one end of a shaft 62 running along the longitudinal axis of the drill to the back of the drill. This shaft is mounted in the housing in bearings 64 so that the shaft is free to rotate with respect to the housing.

The other end of the shaft 62 extends through the back of the housing where a third gear 66 is coaxially fixed thereto. This third gear drives a feed screw 68 through a reduction gear train 70. The first gear in this gear train is an idler gear 72 mounted on a bearing 74 on one end the feed screw 68 extending through the back of the housing. This gear has two toothed surfaces of different diameter. The larger diameter toothed surface is engaged with the teeth on the gear 66. The smaller diameter toothed surface is engaged with the teeth on a second idler gear 76. This second idler gear is mounted on a bearing 78 on the end of the shaft 62 extending through the back of the casing. Like the first idler gear 72, this second idler gear 76 has two toothed surfaces of different diameter. The larger diameter toothed surface is engaged with the smaller diameter toothed surface of the first idler gear 72 and the smaller diameter toothed surface is engaged with a gear 80 fixed to the end of the feed screw 68 extending through the back of the housing 18. When gear 66 rotates, the idler gears 72 and 76 rotate respectively around the shaft 62 and the feed screw 68 transmitting the rotation of gear 66 to gear 80 which drives the feed screw 68.

Normally, the ends of shaft 62 and lead screw 68, and the gears 66, 72, 76 and 80 mounted thereon are covered by a covered plate 82 which prevents the operator from being injured by being caught in the gears while operating the gun. However, this plate can be removed for easy access to the gears for servicing.

The feed screw 68 is mounted along the longitudinal axis of the housing with the threaded portion 84 of the screw centrally located in a rectangular opening 86 on the top of the housing. At each end of the threaded portion 84 the lead screw is supported in the housing by bearings 88 which allow the feed screw to rotate freely with respect to the housing. The rectangular opening 86 is provided with a cover 90 which is pivoted on the front of the housing 16 at point A for movement as shown in FIGURE 8, around an axis which is perpendicular to the axis feed screw 68.

Mounted within the rectangular opening 86 at right angles to the feed screw are four cylindrical rollers 92, 94, 96 and 98. The bottom two rollers 94 and 98 are mounted one on either side of the lead screw 68 on a common shaft 100 positioned horizontally at right angles to the lead screw, below the lead screw. The upper two rollers 92 and 96 are positioned one on either side of the lead screw 68 on a common shaft 102 which is positioned directly above the shaft 100 and parallel to the shaft 100 so that the rollers are arranged in closely spaced pairs, one pair on each side of the lead screw. The shaft 100 is mounted on a carriage 104 which slides, out of engagement with the feed screw 68, on a bar 106 which is mounted in the housing below the feed screw 68 and parallel to the feed screw 68. The shaft 102 is mounted on a carriage 108 which slides on a bar 110 which is mounted in the cover 90 above the feed screw 68 and parallel to the feed screw 68. The carriage 108 is threaded to engage the feed screw 68 for movement longitudinal of the feed screw with rotation of the feed screw and has a triangular protrusion 112 which engages a like indentation of the carriage 104 so that as the feed screw 68 rotates the four rollers move forward in a line towards the front of the housing.

Positioned between the rollers 92 and 94 on one side of the feed screw is a flexible collapsible tube 114 containing one of the liquid ingredients of the mixture, and positioned on the other side of the lead screw between the other two rollers 96 and 98 is a second collapsible tube 116. As the rollers move forward they roll on the shafts 100 and 102 over the surfaces of the collapsible tubes to flatten the collapsible tubes between them and thereby force the liquid out of the tubes.

The tubes are both the same length and have cross sectional areas which differ from each other in magnitude as it is desired the materials contained in the tubes will differ in volume in the mixture. Therefore, as they progress, the rollers will flatten equal lengths of both tubes to dispense the materials from the tubes in the correct proportions for the desired mix.

To prevent the tubes from being pushed forward, crushed and possibly ripped open by the advance of the rollers, the crimped ends of the tubes 114 and 116 are each held in position by a pair of vise like jaws 115 and 117. The bottom jaw is fixed to the back wall of the opening 86. The top jaw is slidably mounted on screws threaded to the cover 90 and has springs 119 mounted between the cover and the jaw in recess. With the cover closed, the crimped ends of the tubes are positioned between the jaws, and the springs 119 cause the jaws to exert sufficient force on the crimped ends to hold the tubes in place while the rollers advance thereby preventing the tubes from being pushed forward and crushed.

When the rollers reach the front of the housing the tubes will have been emptied by the rollers and therefore must be replaced. To facilitate replacement of the tubes the cover 90 for the housing will automatically open to the position shown in FIGURE 8 when the rollers reach their most forward position. The cover 90 is spring loaded and when not latched to the housing will assume the position shown in FIGURE 8. The cover is normally held in position against the housing by the end of the slide bar 110 which passes through the back of the cover and engages the casing at point B.

The slide bar 110 is free to move back and forth along its axis in the cover. It is held in engagement with the housing at point B by a spring 118 which is positioned between the inner wall of the cover and a rod 120 extending transversely through the slide bar and through a slot 122 in the top of the cover. The spring 118 urges the rod 120 against the end of the slot thereby holding the end of the slide bar 110 in engagement with the housing at point B. When the rollers are in their most forward position the carriage 108 contacts the rod 120 compressing the spring 118 and moving the end of the slide bar out of engagement with the housing at point B. The cover 90 which then is unlatched springs to the position shown in FIGURE 8.

With the cover raised the empty tubes may be removed and replaced with filled tubes. The tubes are held in the housing by caps 124 and 126 which are interiorly threaded to engage the threads on the necks 128 and 130 of the tubes and have set screws 132 and 134 which respectively prevent the caps 124 and 126 from falling out of the housing. To disconnect the tubes from the caps 124 and 126, the caps are rotated until the tubes are free of the caps. Then the tubes may be removed and replaced with fresh tubes by connecting them to the caps 124 and 126.

Once the cover is in its raised position, the top carriage 108 is free of engagement with the thread of the feed screw 68 and the lower carriage 104. Therefore both the upper and lower carriages can be moved and are placed in the back of the housing 18 and the cover 90 respectively so that they are in the position shown in FIGURE 3 when the cover is closed after the replacement of the tubes.

The threads on the captive caps 124 and 126 differ from each other, and the thread on the neck of the tube 114 containing one ingredient is made to mate with only the cap 124 while the thread on the tube 116 containing the other ingredient is made to mate with only the cap 126. This is to prevent mixing of the reactive materials in the passageways by successively attaching tubes with different ingredients to the same cap.

The caps each have an axial passageway 136, a number of radial passageways 138 communicating with the axial passageway, and an annular groove 140 communicating with the radial passageways 138. The annular groove for one cap 126 is coupled to the opening 48 in the wall of the mixing chamber by the tube 142 and the annular groove for the other 124 is coupled to the opening 50 by the tube 144 so that the materials being forced from the collapsible tubes 114 and 116 are forced directly into the mixing chamber where they are mixed as discussed above.

To reiterate, when the trigger 52 is pressed the drill motor rotates the drive screw 68 which moves the rollers 92, 94, 96 and 98 across equal lengths of both tubes flattening those lengths of the tubes and forcing the flowable materials therefrom in amounts proportional to the cross sectional areas of the tubes. The materials forced from the tubes are discharged into the mixing chamber 36 where they are mixed, and the mixture is thereafter forced out of the nozzle of the caulking gun by the unmixed materials being forced into the mixing chamber by the rollers. When the seam or crack is filled the operator releases the pressure on the trigger and the rollers and agitator come to a halt. This stops both the mixing and dispensing of the material leaving the mixing chamber filled with the mixture so that dispensing will begin immediately when the trigger is pressed again.

Preferably, the flowable materials employed in the gun are an epoxy resin and an amine catalyst. Therefore, once mixed they harden very quickly into a solid mass, and if the gun is not going to be used for awhile it should be purged of the mixture. Purging is best accomplished by forcing purging liquids into the openings in the cap 124 and 126 while the cover is open to keep the carriage 108 out of contact with the lead screw and the trigger is pressed to operate mixing chamber. In this way the gun may be purged by the operator without the operator contacting the epoxy resin, the amine catalyst or the purging liquids. Therefore the gun may be loaded, operated and cleaned without the operator ever contacting the material being used.

Another form of agitator which may be used in the mixing means of the caulking gun is disclosed in FIGURE 9. This agitator 146 is in the form of a cylinder 148 and a flat rectangular paddle 150 mounted end to end. The cylindrical wall of the cylinder 148 and the side edges of the paddle 150 are spirally grooved, and the paddle 150 has one or more openings there through, preferably one or more slots angled with respect to the axis of the cylinder as is shown at 152 in FIGURE 9.

This agitator 150 is positioned within the mixing chamber 36 with cylindrical wall of the cylinder and side edges of the paddle closely positioned with respect to the interior side wall 38 of the chamber. When the unmixed flowable materials are forced into the chamber through the openings 48 and 50 in the side wall of the chamber, they contact the agitator and are thrust towards the nozzle 40 by the pressure from more of the materials entering the chamber through the openings 48 and 50 and by the force exerted on the materials by the helical or spiral grooves. When the mixture reaches the nozzle they enter the opening 46 in the nozzle and is dispensed. As the materials move through the chamber towards the nozzle they are thoroughly mixed together by contact with the paddle 150, the sidewall 38 of the chamber, and the cylinder 148. Of course, the grooves and the openings in the paddle aid in the mixing.

In the caulking gun a mixing head is necessary. However, in some applications, immediate mixing of the dispensed materials is not necessary or even desired. In such applications the stripping mechanism described above may be employed without a mixing head so that the materials may be dispensed unmixed. Other modifications of the preferred embodiment are also possible and will be readily apparent to those skilled in the art. Therefore it should be understood that this application is intended to cover all changes and modifications of the embodiment of the structure herein chosen for purpose of illustration which do not constitute a departure from the spirit and scope of the invention.

What is claimed is:

1. A device for dispensing reactive contents from two collapsible tubes with exteriorly threaded discharge necks at one end thereof and mixing the contents together comprising:
    (a) a mixing means with threaded ports for each of the threaded necks of the tubes;
    (b) closely spaced rollers which are movable over the the collapsible tubes to flatten the tubes and force their contents into the mixing means when the tubes are positioned with their necks inserted into the threaded ports;
    (c) a feed screw drive coupled to the rollers for driving the rollers; and
    (d) a prime mover connected to the screw drive and the mixing means to simultaneously drive the mixing means and the rollers.

2. The structure of claim 1 wherein:
    (a) said screw drive means is arranged axially of the tubes when the tubes are positioned with the threaded necks of the tubes inserted into the ports of the mixing means; and
    (b) said closely spaced rollers include:
        (i) two rollers axially aligned with each other and driven by the screw drive means to move along the axis of the tubes towards the necks of the tubes when the tubes are positioned with their necks inserted in the ports, the first of the rollers being positioned against one side of one of the tubes and the second of the rollers being positioned against the side of the other of the tubes;
        (ii) two more rollers, one roller closely positioned with respect to and parallel to the first of the first mentioned two rollers with one of the collapsible tubes between them and the other roller closely positioned with respect to and parallel to the second of the first mentioned two rollers with the other one of the collapsible tubes between them, said two more rollers being driven by the screw drive means along with the first mentioned rollers.

3. The structure of claim 2 wherein the second mentioned two rollers are detachable from the screw drive means for the replacement of the tubes.

4. The structure of claim 3 wherein said second mentioned two rollers automatically become detached from the screw drive means when the rollers reach the end of the collapsible tube with the threaded neck portion.

References Cited by the Examiner
UNITED STATES PATENTS

| | | | |
|---|---|---|---|
| 2,064,357 | 12/36 | Ritterbusch | 222—102 X |
| 2,814,827 | 12/57 | Snow et al. | 222—135 X |
| 3,029,983 | 4/62 | Wagenhals | 222—94 |
| 3,117,696 | 1/64 | Herman et al. | 222—145 X |

LOUIS J. DEMBO, *Primary Examiner.*